United States Patent
Chang et al.

(10) Patent No.: US 8,249,081 B2
(45) Date of Patent: Aug. 21, 2012

(54) DYNAMIC VIRTUAL PRIVATE NETWORK (VPN) RESOURCE PROVISIONING USING A DYNAMIC HOST CONFIGURATION PROTOCOL (DHCP) SERVER, A DOMAIN NAME SYSTEM (DNS) AND/OR STATIC IP ASSIGNMENT

(75) Inventors: Arthur Chang, Fremont, CA (US);
Nai-Ting Hsu, Saratoga, CA (US);
Michael Wu, San Jose, CA (US);
Leemay Yen, San Jose, CA (US);
Lingyan Zhao, San Jose, CA (US)

(73) Assignee: Array Networks, Inc., Milpitas, CA (US)

( * ) Notice: Subject to any disclaimer, the term of this patent is extended or adjusted under 35 U.S.C. 154(b) by 1438 days.

(21) Appl. No.: 11/541,179

(22) Filed: Sep. 29, 2006

(65) Prior Publication Data

US 2008/0082640 A1    Apr. 3, 2008

(51) Int. Cl.
*H04L 12/28* (2006.01)
*G06F 13/00* (2006.01)
(52) U.S. Cl. .................. 370/397; 370/395.3; 726/15
(58) Field of Classification Search .............. 370/351, 370/395.1, 395.3, 397; 379/15; 709/219; 725/15
See application file for complete search history.

(56) References Cited

U.S. PATENT DOCUMENTS

| | | | |
|---|---|---|---|
| 6,804,777 B2 * | 10/2004 | Hollis et al. | 713/170 |
| 6,816,882 B1 * | 11/2004 | Conner et al. | 709/203 |
| 7,185,106 B1 | 2/2007 | Moberg et al. | |
| 7,315,888 B2 | 1/2008 | Shibata | |
| 7,840,701 B2 * | 11/2010 | Hsu et al. | 709/238 |
| 2002/0186698 A1 * | 12/2002 | Ceniza | 370/401 |
| 2003/0185207 A1 | 10/2003 | Nakahara | |
| 2004/0162992 A1 | 8/2004 | Sami et al. | |
| 2004/0209613 A1 * | 10/2004 | Hunter et al. | 455/426.1 |
| 2004/0218611 A1 | 11/2004 | Kim | |
| 2004/0268148 A1 * | 12/2004 | Karjala et al. | 713/201 |
| 2005/0088977 A1 | 4/2005 | Roch et al. | |
| 2005/0190705 A1 * | 9/2005 | Moore et al. | 370/254 |
| 2005/0198491 A1 | 9/2005 | Lee et al. | |
| 2005/0273849 A1 * | 12/2005 | Araujo et al. | 726/12 |
| 2007/0061887 A1 * | 3/2007 | Hoover et al. | 726/26 |
| 2007/0081530 A1 * | 4/2007 | Nomura et al. | 370/389 |
| 2007/0153782 A1 | 7/2007 | Fletcher et al. | |

OTHER PUBLICATIONS

R. Droms, "RFC 2131: Dynamic Host Configuration Protocol," Mar. 1997, Network Working Group, p. 1-46.*
P. Mockapetris, "RFC 1035; Domain Names—Implementation and Specification," Nov. 1987, Network Working Group, p. 1-56.*
P. Mockapetris, "RFC 1034: Domain Names Concepts and Facilities," Nov. 1987, p. 1-56.*
Wikipedia, Network Address Translation, Jul. 2006.
PC Magazine, Node Definition from PC Magazine Encyclopedia, Jul. 2009.

* cited by examiner

*Primary Examiner* — Dang Ton
*Assistant Examiner* — Ryan Kavleski
(74) *Attorney, Agent, or Firm* — Buchanan Ingersoll & Rooney PC

(57) ABSTRACT

A method of provisioning resources, which includes hosting at least one resource at a first site. A secure connection is established between the first site and a second site, and a listing of available resources is exported to the second site. The second site publishes the listing of available resources to at least one client and at least one resource from the first site to second site is provisioned by providing the at least one client with an IP address of the at least one resource.

22 Claims, 5 Drawing Sheets

DYNAMIC VIRTUAL PRIVATE NETWORK (VPN) RESOURCE PROVISIONING USING A DYNAMIC HOST CONFIGURATION PROTOCOL (DHCP) SERVER, A DOMAIN NAME SYSTEM (DNS) AND/OR STATIC IP ASSIGNMENT

FIELD OF THE INVENTION

This invention generally relates to a system and method for dynamically provisioning resources configured at one site (the server site) on another site (the client site), and more particularly pertaining to a method for dynamically provisioning resources hosted at one site (the server site) on another site (the client site) in a transparent manner without requiring either administrator to know the topology of the other's network.

BACKGROUND

One of the most utilized networks for interconnecting distributed computer systems is the Internet. The Internet allows user of computer systems to exchange data throughout the world. In addition, many private networks in the form of corporate or commercial networks are connected to the Internet. These private networks are typically referred to as an "intranet." To facilitate data exchange, the intranet generally uses the same communications protocols as the Internet. These Internet protocols (IP) dictate how data is formatted and communicated. In addition, access to corporate networks or intranets can be controlled by virtual private network gateways or devices.

As the popularity of the Internet has grown, businesses have turned to the Internet as a means of extending their own networks. First came the intranet, which was an access-controlled site designed for use only by company employees. Now, many companies are creating their own VPN (virtual private network) comprised of a plurality of network nodes to accommodate the needs of remote employees and distant offices. The VPN is a generally a private network that uses a public network (usually the Internet) to connect remote sites or users together. Instead of using a dedicated, real-world connection such as a leased line, a VPN uses "virtual" connections routed through the Internet from the company's private network to the remote site or employee.

In a typical configuration, a local network uses one of the designated "private" IP address subnets (such as 192.168.x.x, 20.x.x.x or 172.16.x.x-172.31.x.x), and a router on that network has a private address (such as 192.168.0.1) in that address space. The router is also connected to the Internet with a single "public" address or multiple "public" addresses assigned by an Internet Service Provider (ISP). As traffic passes from the local network to the Internet, the source address in each packet is translated on the fly from the private addresses to the public address(es). The router tracks basic data about each active connection (particularly the destination address and port). When a reply returns to the router, it uses the connection tracking data it stored during the outbound phase to determine where on the internal network to forward the reply.

Since, it is very common to have several clients, which will access a single server having a plurality of applications, it would be desirable to provide a method and system for dynamically provisioning resources hosted at one site (the server site) on another site (the client site) in a transparent manner without requiring either administrator knowing the topography of the other's network.

SUMMARY OF THE INVENTION

In accordance with one embodiment, a method of provisioning resources comprises: hosting at least one resource at a first site; establishing a secure connection between the first site and a second site; exporting a listing of available resources to the second site, wherein the second site publishes the listing of available resources to at least one client; and provisioning the at least one resource from the first site to second site by providing the at least one client with an IP address of the at least one resource.

In accordance with a further embodiment, a method of provisioning resources comprises: hosting at least one resource at a first site; establishing a secure connection between the first site and a second site; exporting a list of available resources at the first site to the second site, wherein the first and second sites are virtual private network gateways; and provisioning the at least one resource from the listing of available resource to at least one client associated with the second site.

In accordance with another embodiment, a method of provisioning resources comprises: hosting at least one resource at a first site; establishing a secure connection between the first site and a second site; exporting a list of available resources at the first site to the second site, wherein the first and second sites are virtual private network gateways; provisioning the at least one resource from the listing of available resource to at least one client associated with the second site; and wherein each of the available resources is identified by a resource name, a server port, and a dynamically generated identifier.

BRIEF DESCRIPTION OF THE DRAWINGS

The invention will now be described in greater detail with reference to the preferred embodiments illustrated in the accompanying drawings, in which like elements bear like reference numbers, and wherein.

DETAILED DESCRIPTION

It can be appreciated that today, many industries and enterprises are looking to simplify and optimize their business operations by increasing employee productivity and business agility while streamlining network management and delivering dramatic cost savings. In order to provide a secure, on-demand access both internally and remotely, virtual private network (VPN) devices can connect employees with remote applications and information need to meet the demands of customers, from small, local businesses to large, global enterprises and from financial services and healthcare to government and education. For example, secure access to applications and web-enabled content can be utilized by almost all types of businesses from delivering fast, secure access to administrative and clinical applications and patient records in the healthcare industry, improving customer serving service and services while reducing costs for a financial institution, generating optimum productivity from supply chains and employees for retailers, enabling fast, secure access to administrative and educational applications; providing fast access and iron-clad security for vital operations and data for governmental entities; and the ability to offer fast and secure access and e-mail services, optimum availability and security with streamlined management over the internet.

Web-enabled applications help integrate business systems so they share information and connect employees, suppliers, and administrators to automated business processes. Regardless whether the Internet is being used for financial, supply chain, customer relationship management, or other business critical applications, the essential requirements remain the same that without the appropriate level of performance, availability, and security, applications cannot deliver on promised returns. A virtual private network gateway system can enable businesses to fully maximize their investment in application infrastructure by reducing supply expenses, improving employee retention/recruitments, and enabling employees to better focus on their responsibilities. Moreover, as businesses demand greater access to data and services via Web-based self-help programs, the need for the VPN gateway's performance, availability, and security enhancing products and solutions has never been greater.

Figure 1:
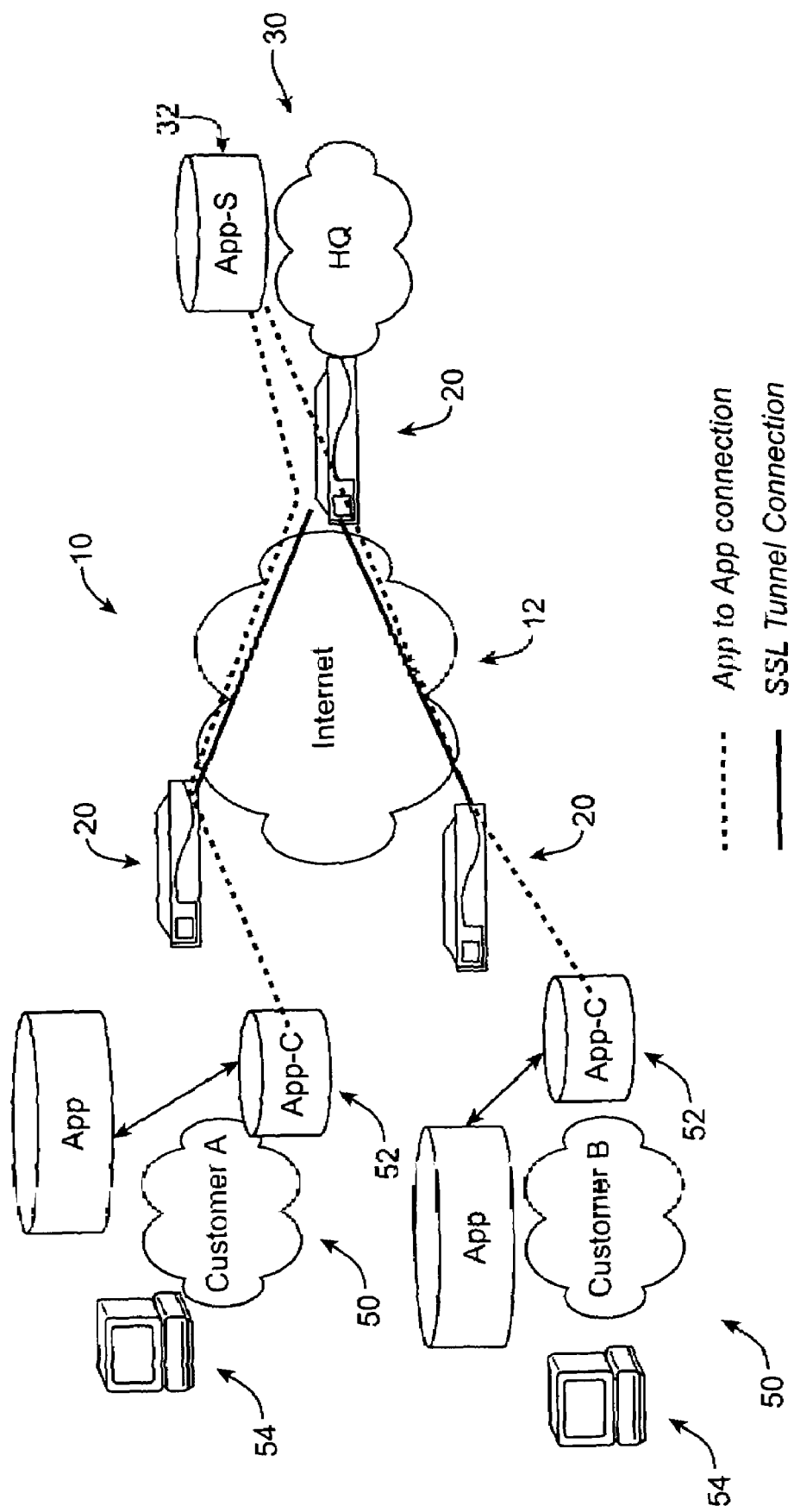
FIG. 1 shows a schematic diagram of a virtual private network having secured site to site application access in accordance with one embodiment of dynamically provisioning resources configured at one site (the server site) on another site (the client site).

FIG. 1 shows a schematic diagram of a virtual private network (VPN) system 10 in accordance with one embodiment of dynamically provisioning resources hosted at a first site 30 (or server site) on a second site 50 (client site). As shown in FIG. 1, the system 10 is comprised of at least two virtual private network (VPN) devices or gateways 20, a first site 30 having at least one application server 32 configured to host at least one application, and at least one second site 50. The at least one second site 50 offers the client (or customer) the ability to remotely access the application server 32 via a communication network 12 (i.e., the Internet) by accessing the first site 30 via the at least two VPN devices or gateways 20. The second site 50 can also include at least one application server 52 configured to host at least one application. It can be appreciated that the use of first site 30 and second site 50 can be used interchangeably, i.e., the first site 30 may be acting a second site 50 and vice-versa, if the system 10 includes two-way application-to-application access.

For example, as shown in FIG. 1, the first site 30 (i.e., company headquarters) includes an application server 32. The second site 50 is comprised of at least one client or client machine 54 and more preferably at least two client or client machines 54, which can include customers (i.e., Customer A and Customer B), other company offices of the first site 30, etc. Each of the client sites 50 also can include at least one application server 52, wherein the first site 30 (Company Headquarters) can access applications or resources on the client site application servers 52. In such a case, a two-way application-to-application access exists.

In accordance with one embodiment, the VPN device or gateway 20 is configured to prevent tampering with private resources by unauthorized users using an authentication, authorization and accounting/auditing system known as AAA. The operation of the VPN device is determined by security policies, as contained within the authentication and authorization server or an AAA server. An AAA server can be implemented on the VPN device or as a dedicated server communicating with the VPN device. The authentication and authorization (or AAA) servers are used for more secure access in a remote-access VPN environment. When a request to establish a session comes in from a client, the request is proxied to the authentication and authorization (AAA) server.

Figure 2:
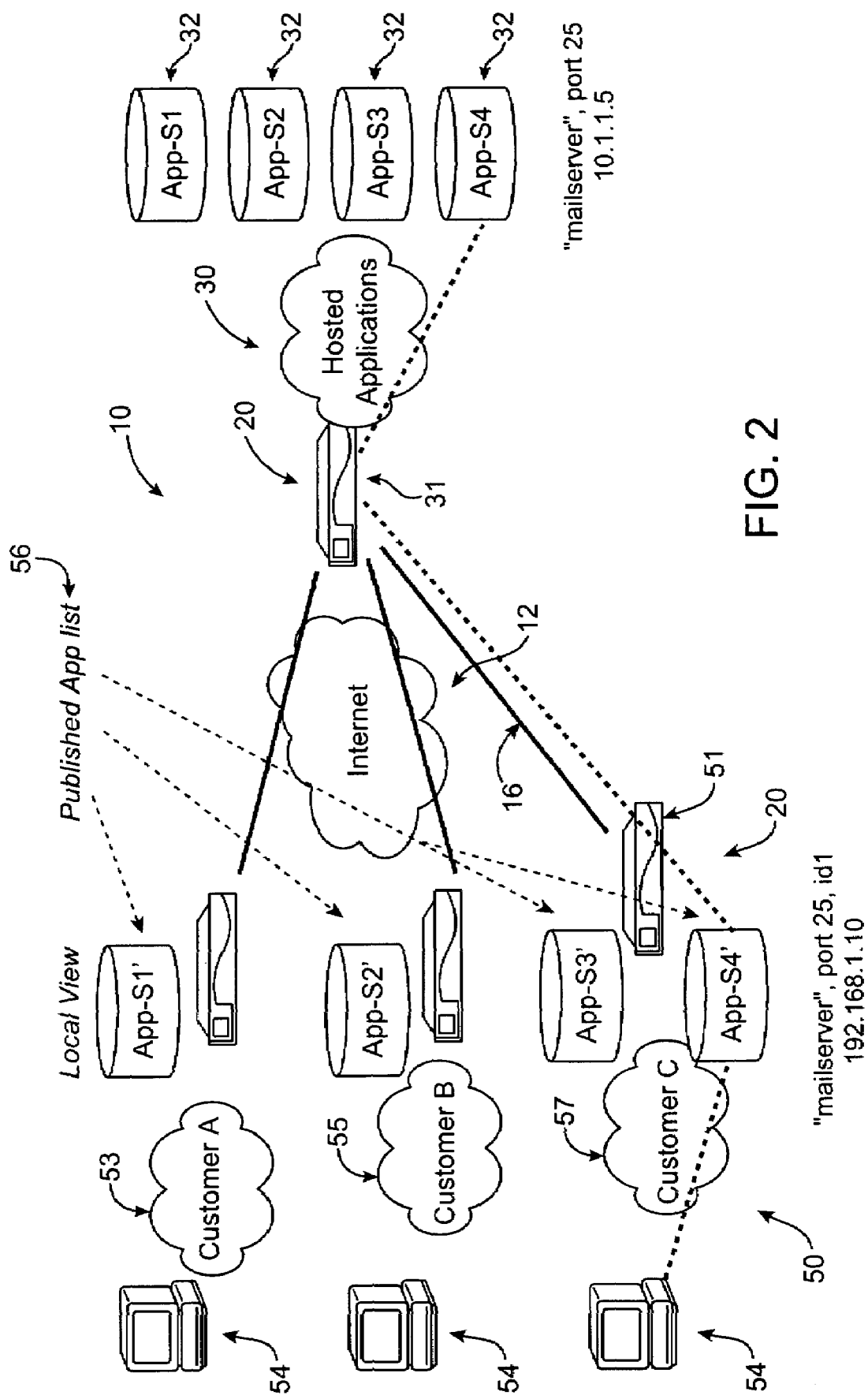
FIG. 2 shows a schematic diagram of a virtual private network having controlled application access by selectively provisioning resources configured at one site (the server site) on another site (the client site) in accordance with another embodiment.

FIG. 2 shows a schematic diagram of a dynamic VPN system 10 having a secured application-to-application access by selectively provisioning resources configured at one site (the server site) on another site (the client site). The system 10 as shown in FIG. 2 can provide controlled access to a plurality of resources, which are hosted by a first site 30. The plurality of resources can be securely accessed by a plurality of client sites 50, wherein the plurality of client sites 50 are transparent to the other clients, which have access to the plurality of resources. As shown in FIG. 2, the system 10 can include a plurality of VPN gateways 20 connecting a plurality of second sites 50, (e.g., client site 53 or Customer A, client site 55 or Customer B, and client site 57 or Customer C) with a first site 30 (server site), which is configured to host a plurality of resources or applications. In use, a secure tunnel 16 is preferably established between the first site 30 and the second site 50. The first and second sites 30, 50 are preferably connected by virtual private network gateways 31, 51. However, it can be appreciated that the first and second sites 30, 50 can be any suitable networking device. Although, as shown in FIG. 2, the system 10 is configured for one-way access from the second site 50 to the first site 30, it can be appreciated that the second site 50 can be configured to host at least one resource or application (not shown), such that the sites 30, 50 can be a server site and a client site, for example in the exchange of e-mail within a company or between partners. The system 10 provides a secure application-to-application access on demand, which can enable resources and applications such as remote printing, file servers and e-mail relay and forwarding to be secure and transparent to the internet. In addition, it can be appreciated that the system 10 can be implemented into a network without changing the network of the client and/or customers.

In accordance with this embodiment, each of the sites 30, 50 preferably contain at least one resource, which can remotely be accessed in a transparent manner without requiring either administrator knowing the topography of the other's network. The listing of resources or applications 32 are preferably published based on a site-by-site basis. Accordingly, as shown in FIG. 2, the second site 50 can be configured to have access to a plurality of resources 32 on the first site 30, which can be identified as App-S1, App-S2, App-S3, and App-S4. Since, it may not be desirable to allow each and every second site 50 access to each and every resource 32, each first site 30 preferably publishes a list of resources 32 available via the second site 50. For example, client site 53 (or Customer A) can have access to App-S1, client site 55 (or Customer B) having access to App-S2, and client site 57 (or Customer C) having access to App-S3 and App-S4. The VPN gateway 20 controls the access to the resources via a suitable access control list (ACL) or other suitable system or protocol of determining the appropriate access rights to the applications or resources. The ACL is preferably deployed locally, such that access to the plurality of resources or applications can be managed at the second site 50 and the first site 30, such that each of the client sites 50 can limit access to certain individual users or client devices 54 and the first site 30 can limit the access from certain client sites 50.

In accordance with one embodiment, the first site 30 can have a centralized user authentication system located within the first site 30. In addition, a secure tunnel is preferably brought up or established on demand to allow the system the ability to maximize productivity.

In accordance with another embodiment, the system 10 also provides a single entry point to the network for local and remote application and resources. In addition, it can be appreciated that the system 10 can be configured to allow the end point user or client access to only those applications in which the user has access, and can be configured to allow the user to only "see" those resources or application 32 in which the user (i.e., client or client machine) 54 has access.

In accordance with one embodiment, the system 10 can dynamically provision resources 32 configured at one site (the first site 30) on another site (the second site 50) in such a manner that the resources 32 are transparent to other accessing the applications. The first site 30 preferably includes a resource 32, for example a mail server resource named "mailserver." This mail server is configured having a numeric IP address of 10.1.1.5 and port 25. The second site 50 connects to the first site 30 and receives the available resources listing. In order to maintain network opacity for security, only the minimum data needed for making the resources available will be transferred. In accordance with one embodiment, only the resource name, the server port, and a unique identifier will be exported to the second site 50. The unique identifier can be any value; for this example it will be 1. The second site 50 receives "mailserver", port 25, id 1.

In order to make the remote resource available locally, the second site 50 preferably includes a Dynamic Host Configuration Protocol (DHCP) server configured on the second site 50. It is also possible for the client and server IP addresses to be chosen from IP pools configured on the second site 50. IP addresses would be obtained from these pools instead of an external server. It can be appreciated that other suitable protocol or rules to allow the second site 50 to request and obtain an Internet address from the first site 30 which has a list of addresses available for assignment can be used. In accordance with one embodiment, the DHCP server would provide available IP addresses for use by the second site 50 in provisioning remote resources. For example, the resource "mailserver" could be assigned to the IP address 192.168.1.10. The second site 50 will now start accepting connections on 192.168.1.10 port 25 for resource "mailserver". It can be appreciated that in order to minimize the number of unique IP addresses required, the same IP can be reused for multiple resources as long as the ports don't overlap.

Each time the second site 50 receives a connection on 192.168.1.10 port 25 it will tunnel the traffic over the tunnel 16 to the first site 30. The second site 50 also preferably includes information identifying the unique client machine that the traffic originated from. It can be appreciated that dynamic client identifiers can be created each time a new client is detected. The dynamic client identifier or client id preferably is an arbitrary random but unique value that contains no information about the client. For example, the client id could be the value 2. The second site 50 then notifies the first site 30 that client 2 is attempting to connect to resource 1.

In addition, it can be appreciated that the first site 30 also needs to assign client IP addresses (or client machine IP address), which can be used as source addresses for connecting to the available resources. Typically, the client IP address is utilized where the first site 30 needs to initiate connections back to the client (i.e. active mode File Transfer Protocol (FTP)). The client IP addresses can also be obtained from a DHCP server located on the first site 30. On the first site 30 these IP addresses may not be able to be reused for multiple clients; rather each client may require its own IP address because the required ports cannot be determined in advance. Traffic received from the resource for the client is sent back to the second site 50 for client id 2 from resource id 1.

In accordance with one embodiment, a virtual connection can be established between a first site 30 resource 32 and a second site 50 client 54 without revealing any information about either the first site 30 or the second site 50 to the other network. In addition, both the first site 30 and the second site 50 are transparently assigned IP addresses in the other's network without requiring either administrator to know the other side's topology. The transparent nature of the connection is performed by using a "dual NAT" mechanism of assigning IP addresses to the available resources 32 hosted on a first site 30 and the client or client machine 54 associated with the second site 50.

In order for the client machines 54 at the second site 50 to access the first site 30 resources 32, the client machines 54 typically must either have a hostname or an IP address to connect to. Accordingly, a listing of available resources 32 can be published by a site administrator. The listing of available resources 32 can be published by any suitable mechanism in which the local administrator chooses to develop. For example, if the administrator chooses to publish based on IP address then there is no further need for name resolution. Alternatively, the administrator can choose to publish based on hostname, then the first site 30 resources need to be given hostnames that are unique numbers within the site. In accordance with one embodiment, the administrator can provide the hostnames with a domain name (configured on the client site) that does not conflict with other hosts on the network. For example, the resource name could then be prepended with the domain name, such as dynvpn, which would be "mailserver.dynvpn." It can be appreciated that since dynvpn is not one of the standard com, edu, or org domains, it will not conflict with the standard domain names, such that any non-conflicting domain name can be used. Although, the resource name as the host portion does impose some restrictions on the resource name, it can be appreciated that this can be utilized in the publication of the listing of available resources 32.

In terms of performing the actual name resolution, it can be appreciated that any suitable method can be used. For example, the virtual private network gateway 20 (VPN) can act as the primary name server for all second site 50 client or client machines 54, the virtual private network gateway 20 (VPN) can act as the zone authority for the configured domain, or the virtual private network gateway 20 (VPN) can attempt to automatically update any existing name servers.

If the virtual private network gateway 20 (VPN) can act as the primary name server for all clients, any updates to resources would be reflected immediately. If the virtual private network gateway 20 (VPN) is the primary name server for all clients or client machines 54, it is preferable that the virtual private network gateway 20 (VPN) is in a clustered configuration with a backup virtual private network gateway 20 (VPN) acting as the secondary name server.

In accordance with another embodiment, the virtual private network gateway 20 (VPN) can act as the zone authority for the resource domain. For example, the administrator can continue to use the existing name servers. However, it can be appreciated that the existing name servers are preferably configured to use the virtual private network gateway 20 (VPN) as the zone authority for the resource domain. In accordance with a further embodiment, the virtual private network gateway 20 (VPN) can send updates to the existing name servers for the resource hostnames.

It can be appreciated that the hostname to IP mappings will need to be changed from time to time. First, adding a new resource would require a new hostname to IP mapping, which does not impact existing entries. Second, removing a resource would require removing an existing hostname to IP mapping. Although the hostname and IP may be cached on some client machines, the client site (or second site 50) may not accept connections for the removed resource. Finally, a resource may have its configuration changed. In the context of the dynamic virtual private network system 10, a configuration change may be only possible in the case that a resource is removed and then the exact same resource name is reused for a different server function. For example, the POP mail server may be removed and a new IMAP mail server added using the same "mailserver" resource name. It can be appreciated that the deletion of an existing resource, then, the addition of a new resource, constitutes a change in the list of available resources, and the local administrator will be required to make any changes needed. This can range from flushing DNS caches to informing the users.

Alternatively, a network administrator can configure the sites 30, 50 to retain their actual IP addresses, such that no address mapping would be needed. It can be appreciated that if no address mapping is performed, the system operates in a "transparent mode."

Figure 3:
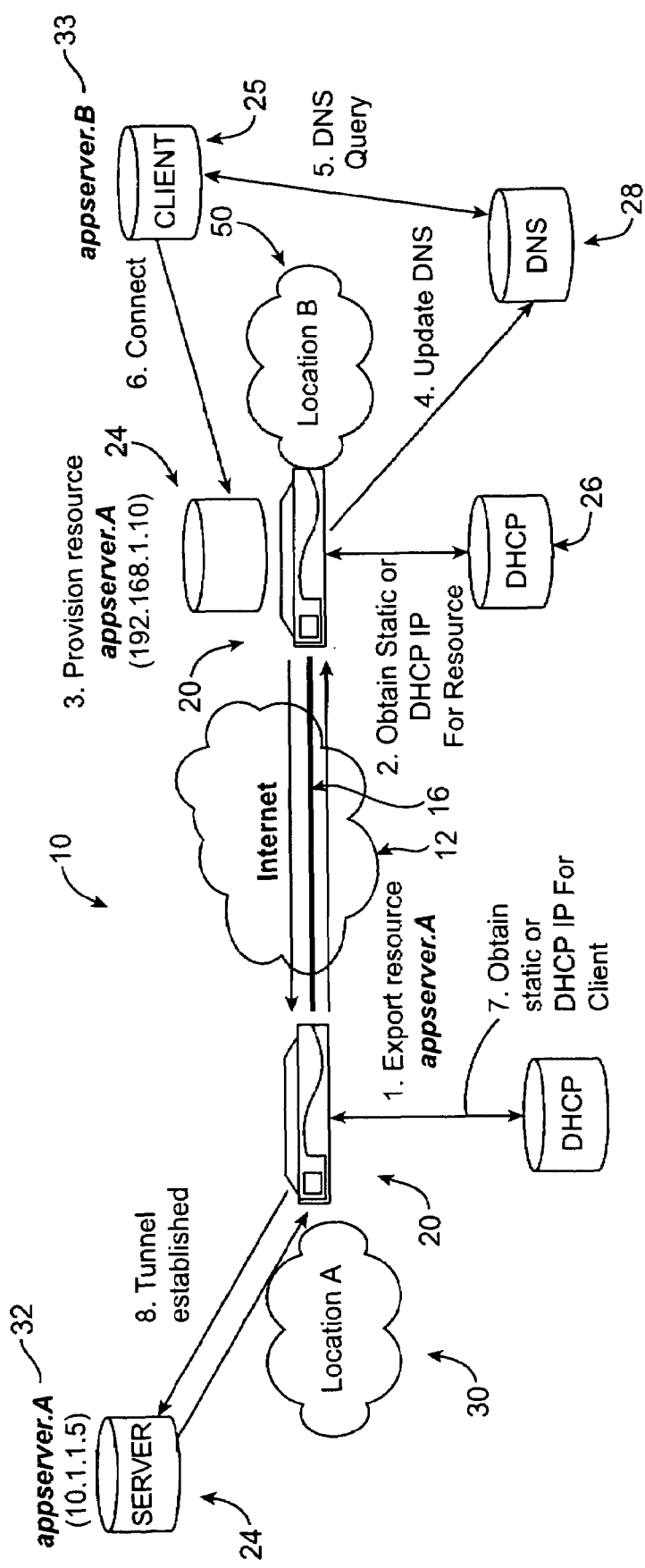
FIG. 3 shows a schematic diagram of a virtual private network gateway having application-to-application access using a Domain Name System (DNS) and DHCP for dynamic resource provision in accordance with another embodiment.

FIG. 3 shows a schematic diagram of a system 10 for provision a resource 32 from a first site 30 (Location A) on a second site 50 (Location B). As shown in FIG. 3, the system 10 includes a first site 30 configured to host at least one resource 32 (appserver.A). The at least one resource 32 is preferably hosted on a server 24 within the first site 30. The first site 30 is preferably a virtual private network gateway or device 20. A secure connection 16, preferably in the form of a SSL tunnel or other suitable tunnel protocol is established between the first site 30 and a second site 50, such that the at least one resource 32 at the first site 30 is exported to a second site 50. The second site 50 is also preferably a virtual private network gateway or device 20. As shown in FIG. 3, in accordance with one embodiment, the at least one resource 32 can be exported from the first site 30 to the second site 50 using any suitable server 24.

It can be appreciated that each time a connection between the first site and the second site 50 is established, the second site 50 will receive a list of available resources 32 and will make the at least one resource available locally by obtaining an IP address for the at least one resource 32. The IP address can be obtained from a pool or plurality of static IP addresses, an actual or pre-assigned IP address for the first site 30, or from a DHCP server 26 (Step 2) situated within the second site 50. The DHCP server 26 provides a list of available IP addresses for use by the second site 50 for provisioning the at least one resource 32.

In accordance with one embodiment, the DHCP server 26 would provide available EP addresses for use by the second site 50 in provisioning remote resources. For example, the resource 32 (appserver.A) could be assigned to the IP address 192.168.1.10 at the second site 50. The second site 50 will now start accepting connections on 192.168.1.10 port 21 for resource 32 (appserver.A). It can be appreciated that in order to minimize the number of unique IP addresses required, the same IP can be reused for multiple resources as long as the ports don't overlap.

The second site 50 is also configured for another resource 33 (appserver.B) on a client machine 25 at the second site 50 to access one resource 32 (appserver.A) at the first site 30. Each time the second site 50 receives a connection on 192.168.1.10 port 21 it will tunnel the traffic over the tunnel to the first site 30. The second site 50 also preferably includes information identifying the unique client machine 25 that the traffic originated from. It can be appreciated that dynamic client identifiers can be created each time a new client is detected. The dynamic client identifier or client id preferably is an arbitrary random but unique value that contains no information about the client.

In addition, the first site 30 can be configured to assign clients IP addresses, which can be used as source addresses for connecting to the server resources. Typically, the client EP address is utilized where the first site 30 needs to initiate connections back to the client (i.e. active mode File Transfer Protocol (FTP)). The client IP addresses can also be obtained from a DHCP server 26 at the first site 30 (step 7). In accordance with one embodiment, a virtual connection can be established between a first site 30 resource and a second site 50 resource without revealing any information about either the server or the client to the other network. In addition, both the first site 30 and second site 50 are transparently assigned IP addresses in the other's network without requiring either administrator to know the other side's topology.

In order for the client machines at the second site 50 to access the first site 30 resources, the client machines typically must either have a hostname or an IP address to connect to. Accordingly, a list of resources 32 can be published by the second site 50 administrator using a domain name system (DNS) server 28 (Step 4). The domain name server 28 can be used to translate the domain names associated with the list of resources to IP addresses (Step 5). The list of resources can be published by any suitable mechanism in which the local administrator chooses to develop. For example, if the administrator chooses to publish based on IP address then there is no further need for name resolution. Alternatively, the administrator can choose to publish based on hostname, then the first site 30 resources need to be given hostnames that are unique within the second site 50. For example, the administrator can provide the hostnames with a domain name (configured on the second site 50) that does not conflict with other hosts on the network.

Figure 4:
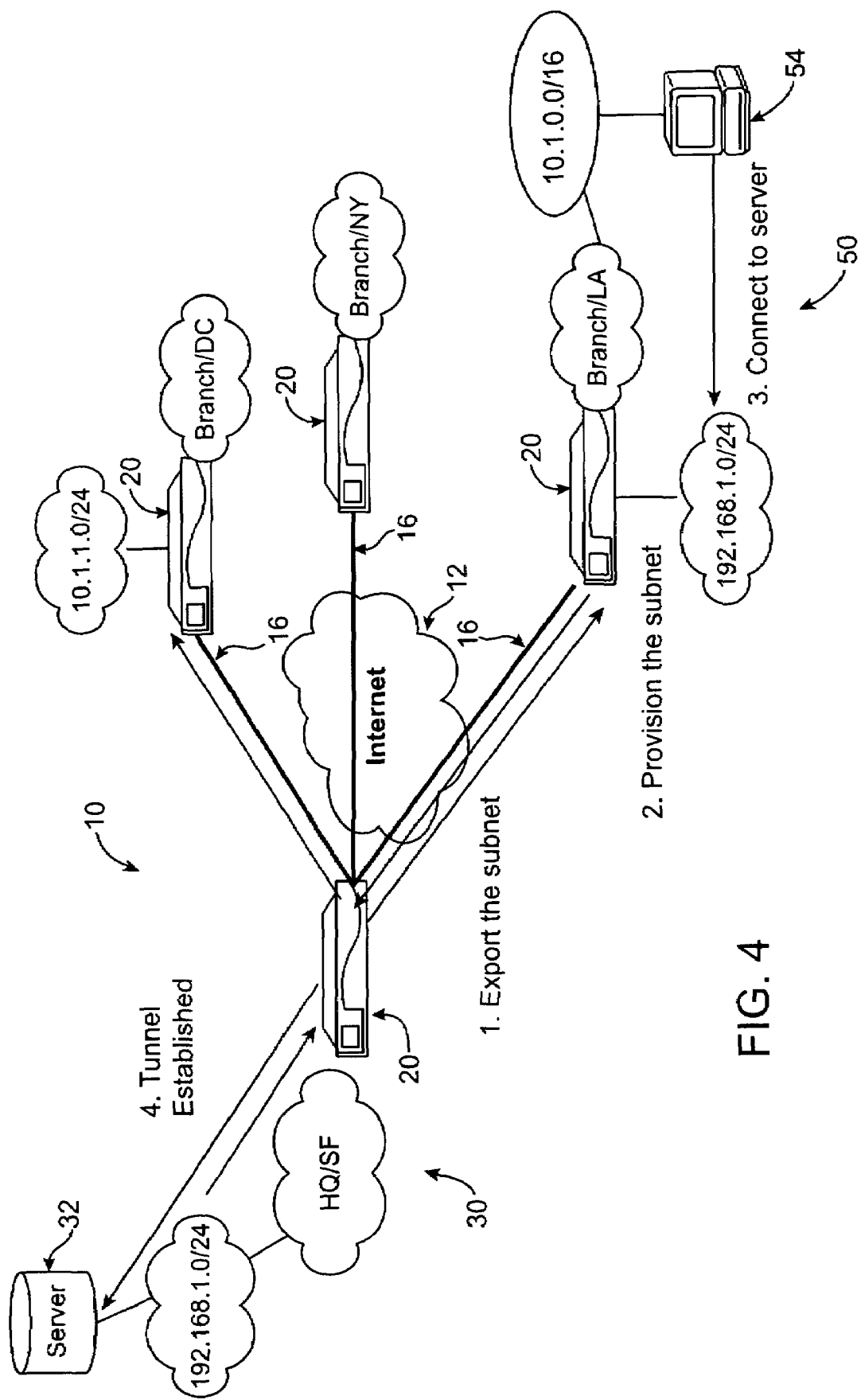
FIG. 4 shows a schematic diagram of a system for provisioning a subnet for network to network connectivity in accordance with a further embodiment.

FIG. 4 shows a schematic diagram of a system 10 for provisioning a subnet or physical network of an inter-network for network to network connectivity in accordance with another embodiment. As shown in FIG. 4, the system 10 includes a plurality of virtual private network gateways 20, which are interconnected to one another. The plurality of virtual private network gateways 20 is configured to connect a primary site with a plurality of subnets or remote sites. For example, a company based in San Francisco, Calif. could have sites (i.e., office) located in Washington, D.C., New York and Los Angeles. It can be appreciated that the system 10 can be configured to export a resource or other application by provisioning the subnet from at least one of the sites configured to host at least one resource or application.

In accordance with one embodiment, the first site 30 can be configured to export the resource or application to a remote or second site 50 by provisioning the application or resource via a secure tunnel, which is established between the second site 50 and the first site 30. The client or client machine 54 connects to the second site 50, wherein the client or client machine 54 requests the at least one resource or application from the first site 30, which is the then provisioned to the client or client machine 54. It can be appreciated that the dynamic virtual private network provisioning using domain name system (DNS) can be implemented in a number of situations, including secured site to site or application to application access (one way and/or two way) as shown in FIG. 3, or a hub-spoke relationship as shown in FIG. 4, or a peer-to-peer application between two sites within a company having one or more sites, or an entire network of client machines.

Figure 5:
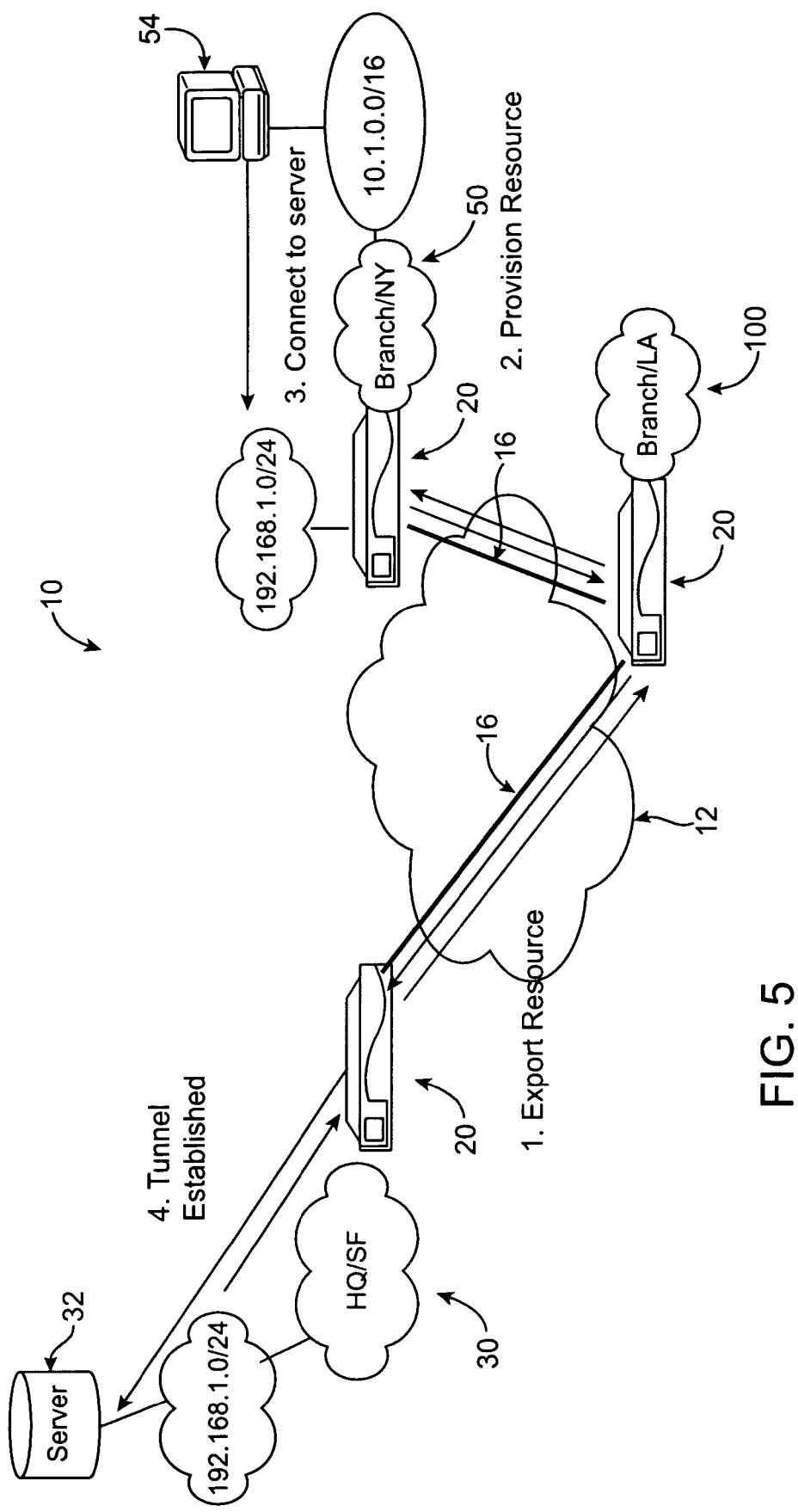
FIG. 5 shows a schematic diagram of a system for provisioning resources through an intermediated site in accordance with a further embodiment.

FIG. 5 shows a schematic diagram of a system for provisioning resources through at least one intermediate site 100. The system 10 comprises a first site 30, a second site 50, and at least one intermediate site 100 located between the first site 30 and the second site 50. The first site 30 is configured to host the at least one resource 32, which can be exported to the second site 50 for provisioning to at least one client machine 54. As shown in FIG. 5, the at least one resource 32 can be exported from the first site 30 to the second site 50 via the at least one intermediate site 100 to the second site 50, which is then provisioned to the at least one client 54. It can be appreciated that the intermediate site 100 is preferably a virtual private network gateway 20, which is configured to receive the available listing of resources from the first site 30 and is capable of exporting the list of resources to the second site 50, which can provision the at least one resource 32 to at least one client machine 54.

It can be appreciated that the at least one intermediate site 100 can be configured to host the at least one resource 32, which is exported from the first site 30 to the intermediate site 100. In accordance with a further embodiment, the intermediate site 100 upon connection with the second site 50 exports the list of available resources to the second site 50, wherein the second site 50 is configured to provision the resources to the at least one client or client machine 54 associated within the second site 50.

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. A method of provisioning resources comprising: hosting at least one application on a first network; establishing at least one secure connection between the first network and a second network using a virtual private network gateway associated with each of the first and the second networks;
    exporting a listing of available applications from the first network to the second network, wherein the second network publishes the listing of available applications to at least one client on the second network;
    enabling the at least one client on the second network to access the at least one application hosted on the first network by assigning a local IP address on the second network to the at least one application without revealing a network topology of the first network to the at least one client;
    provisioning the at least one application from the first network to the second network by providing the at least one client with the local IP address of the at least one application;
    transmitting a request from the at least one client on the second network through the at least one secure connection between the virtual private network gateways to the first network for the at least one application hosted on the first network;
    assigning a local IP address on the first network to the at least one client without revealing a network topology of the second network to the at least one application and transmitting the request from the at least one client to the at least one application using the assigned local IP address on the first network; and
    transmitting any response from the at least one application on the first network received on the at least one client's assigned local IP address on the first network through the at least one secure connection between the virtual private gateways to the at least one client on the second network using the at least one application's assigned local IP address on the second network.

2. The method of claim 1, wherein the IP address of the at least one application is assigned by a dynamic host configuration protocol (DHCP) server configured on the second network.

3. The method of claim 1, wherein the IP address of the at least one client is assigned by a dynamic host configuration protocol (DHCP) server configured on the first network.

4. The method of claim 1, wherein the IP address of the at least one application is assigned by using an IP pool of addresses configured on the second network.

5. The method of claim 1, wherein the IP address of the at least one client is assigned by using an IP pool of addresses configured on the first network.

6. The method of claim 1, wherein the IP address of the at least one application is assigned using an actual IP address of the at least one application.

7. The method of claim 1, wherein the IP address of the at least one client is assigned by using an actual IP address of the at least one client.

8. The method of claim 1, wherein the listing of available applications includes only an application name, a server port and an identifier for each of the applications.

9. The method of claim 1, wherein the second network further comprises a domain name system (DNS) server.

10. The method of claim 1, further comprising providing information identifying the at least one client to the first network.

11. The method of claim 10, wherein the information identifying the at least one client is an arbitrary and random identifier.

12. The method of claim 1, further comprising providing information identifying the at least one client to the at least one application.

13. The method of claim 1, wherein the at least one secure connection is generated using a secure socket layer (SSL) or transport layer security (TLS) protocol.

14. The method of claim 1, further comprising at least one intermediate network, wherein the at least one intermediate network is between the first network and the second network.

15. The method of claim 1, wherein the second network includes a primary name server for the listing of available applications on the second network.

16. The method of claim 1, wherein the second network includes a zone authority server for the listing of available applications.

17. The method of claim 1, wherein the second network is configured to send updates to an existing name server (DNS) of hostnames for the listing of available applications.

18. The method of claim 1, wherein each of the available applications is identified by only an application name, a server port, and a dynamically generated identifier.

19. A method of provisioning resources comprising: hosting at least one application on a first network;
    establishing at least one secure connection between the first network and a second network;

exporting a list of available applications from the first network to the second network, wherein the first and second networks each include a virtual private network gateway;

publishing the list of available applications to at least one client on the second network;

enabling the at least one client on the second network to access the at least one application hosted on the first network by assigning a local IP address on the second network to the at least one application without revealing a network topology of the first network to the at least one client;

provisioning the at least one application from the first network to the second network by providing the at least one client with the local IP address of the at least one application on the second network;

transmitting a request from the at least one client on the second network through the at least one secure connection between the virtual private network gateways to the first network for the at least one application hosted on the first network;

assigning a local IP address on the first network to the at least one client without revealing a network topology of the second network to the at least one application and transmitting the request from the at least one client to the at least one application using the assigned local IP address on the first network;

transmitting any response from the at least one application on the first network received on the at least one client's assigned local IP address on the first network through the at least one secure connection between the virtual private gateways to the at least one client on the second network using the at least one application's assigned local IP address on the second network; and wherein each of the available applications is identified only by a resource name, a server port, and a dynamically generated identifier.

20. The method of claim 1, further comprising:

updating a domain name system (DNS) server on the second network with the IP address of the at least one application; and receiving a DNS query from the at least one client for the local IP address on the second network of the at least one application.

21. The method of claim 1, wherein the at least one client is a plurality of clients, and wherein each of the plurality of clients does not have access to each and every application within the listing of available applications.

22. The method of claim 1, wherein the second network includes a plurality of networks, and wherein each of the plurality of networks does not have access to each and every application within the listing of available applications.

* * * * *